Sept. 29, 1959

H. R. MERLIN, JR 2,907,019

CODE TRANSLATOR

Filed Sept. 6, 1955

2 Sheets-Sheet 1

INVENTOR
H. R. MERLIN, JR.
BY
ATTORNEY

Sept. 29, 1959 H. R. MERLIN, JR 2,907,019

CODE TRANSLATOR

Filed Sept. 6, 1955 2 Sheets-Sheet 2

INVENTOR
H. R. MERLIN, JR.
BY
ATTORNEY

United States Patent Office 2,907,019

Patented Sept. 29, 1959

2,907,019

CODE TRANSLATOR

Howard R. Merlin, Jr., Brooklyn, N.Y., assignor to Bell Telephone Laboratories, Incorporated, New York, N.Y., a corporation of New York Application September 6, 1955, Serial No. 532,660

6 Claims. (Cl. 340—347)

Figure 1:
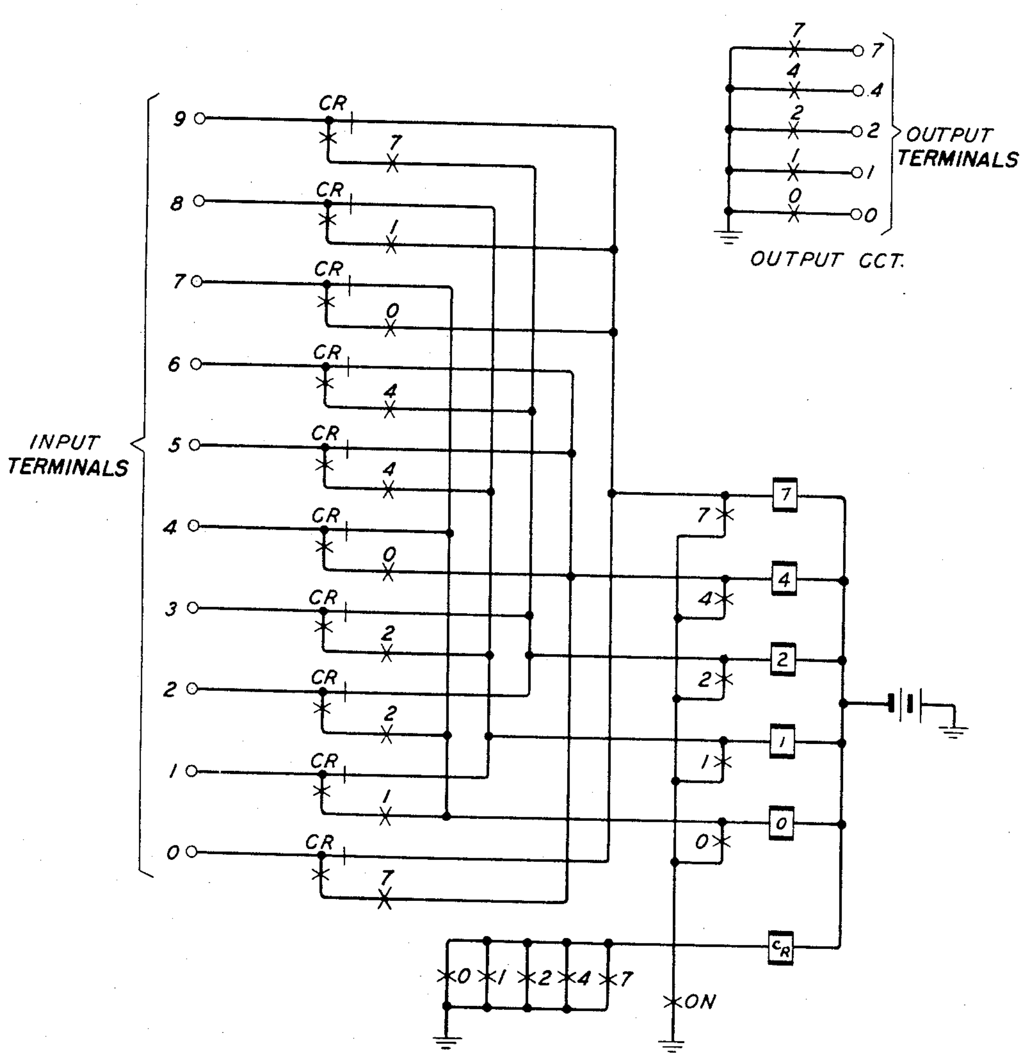

This invention relates to code translators and more particularly to such translators in which electromechanical relays serve as the active translating elements.

Varieties of relay code translators have heretofore been proposed, illustrative of which is that disclosed in Patent No. 2,369,474 granted to H. P. Luhn on February 13, 1945. However, in known translators in which the number of elements in the input code is greater than the number of elements in the output code, the number of translating relays has been equal to or greater than the number of the input code elements, and it is an object of this invention to more effectively utilize such relays in a translator of the aforementioned type in order that the total thereof may be reduced to a number less than the number of elements in the input code.

Accordingly, in accordance with one feature of this invention, paths from a plurality of coded input terminals are variably extended by a routing relay to a lesser plurality of translating relays, thereby advantageously eliminating several of such translating relays.

In accordance with another feature of this invention, the aforementioned translating relays are arranged to retain the information translated thereby until reset by externally connected apparatus.

In accordance with yet another feature of this invention, the circuitry is arranged to prevent backup of actuating potential to unenergized input terminals.

Figure 2:
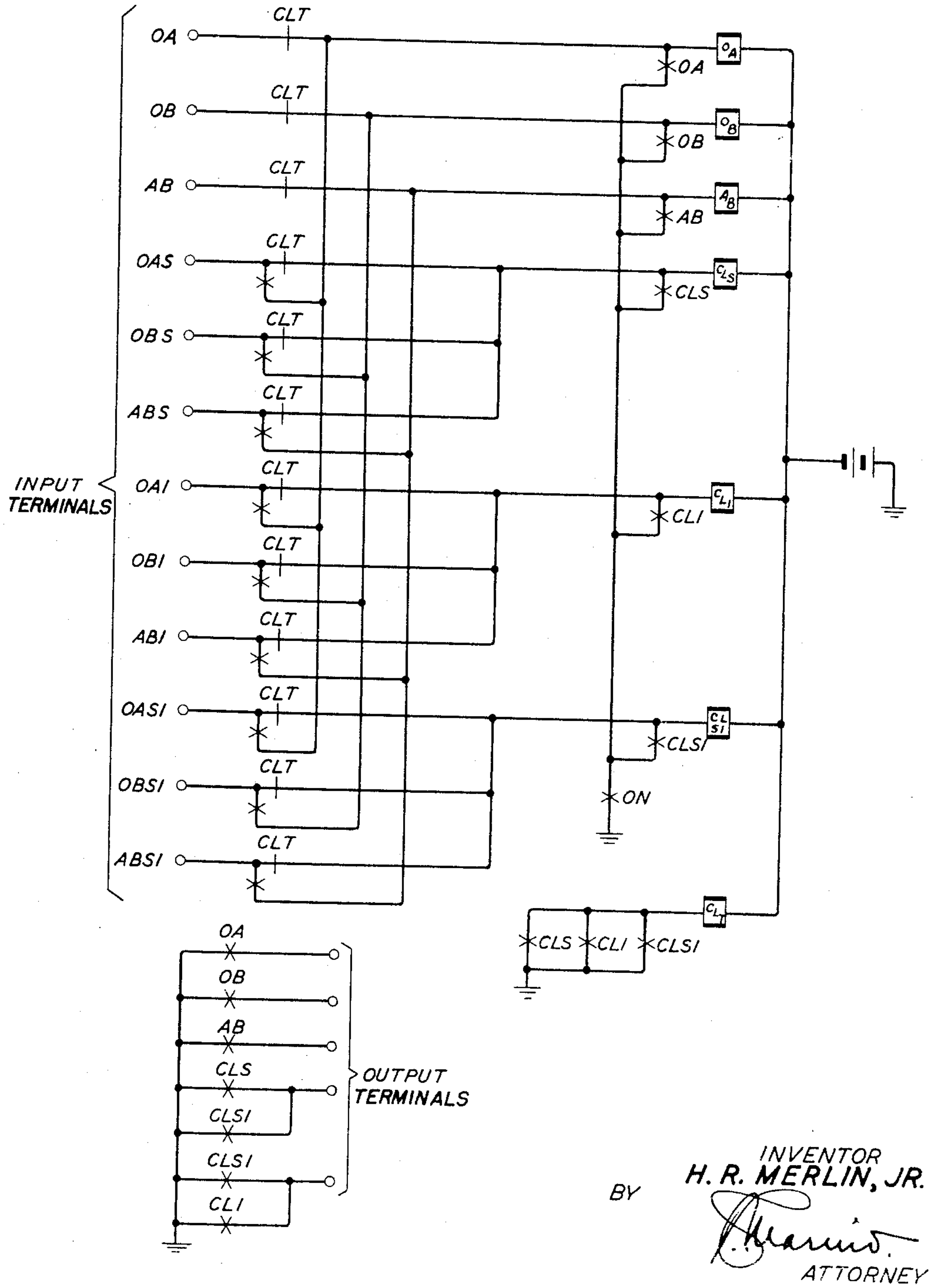

These, together with other objects and features of this invention, will be apparent from the following detailed description with reference to the drawing in which:

Fig. 1 is a schematic diagram of an embodiment of the invention contemplating a decimal code input and a two-out-of-five code output; and Fig. 2 is a schematic diagram disclosing a modification of the embodiment of Fig. 1 for translation from one-out-of-twelve code to one- and two- and three-out-of-five code.

The schematic diagrams are prepared according to a convention in which the contacts of relays are not located in proximity to the associated operating coils. A normally open (front) contact is represented by an X interposed in a line, whereas a normally closed (back) contact is represented by a short line at right angles to and lying across a line.

Referring now to Fig. 1, it will be noted that ten input terminals designated 0 through 9, five output terminals designated 0, 1, 2, 4, and 7, six relays identified 0, 1, 2, 4, 7 and CR and interconnecting circuitry are therein depicted. Each of the ten input terminals is representative of the decimal digit by which it is identified and each of the five output terminals is identified according to the well-known two-out-of-five code, in which decimal values are expressed by the sum of the identifying numerals of the two output terminals selected, except for 0 which is represented by the numerals 4 and 7. Translation from one-out-of-ten to two-out-of-five codes is performed in the following manner.

Initially, normally open contacts On are closed in order to prepare the translator for operation. These contacts, when later opened, serve to reset the translator and may be actuated by any of a variety of apparatus well known in the telephone art. Information is then presented to the translator by grounding an information-representing terminal. Any one of the input terminals may be selected at random and connected to ground, thereby completing a path from said ground to battery through back contacts of relay CR and the operating coil of one of the translating relays identified 0, 1, 2, 4, and 7. For example, if ground is connected to input terminal 7, a path will be established therefrom through the back contacts of relay CR and the coil of relay 0, to battery. Relay 0 will operate in this circuit and, in operating, will lock to ground over its own front contacts, thereby completing a path from ground through another of its pairs of front contacts to the coil of relay CR and thence to battery. Relay CR is a routing relay, contacts of which appear in each of the paths leading into the translator from the input terminals. In operating, routing contacts of relay CR establish another path from ground through terminal 7, relay CR front contacts, relay 0 front contacts, and the operating coil of relay 7, to battery. Simultaneously therewith, back contacts of relay CR open, thus interrupting the path from ground through terminal 7 to the relay 0 operating coil, which relay, however, is locked as before described. Relay 7, in operating, locks itself to ground over its own front contacts. Thus relays 0 and 7 are locked in their operated positions and extend paths from ground through additional front contacts of each to output terminals 0 and 7. Translation is now complete and relays 0, 7, and CR will remain operated until reset by opening of the "On" switch.

In Fig. 1, it will be noted that a CR front contact is serially connected to another front contact in each of the ten routing circuits leading from the ten input terminals. As hereinbefore explained, a path is thereby routed to one of the two translating devices required to effect translation. The front contact serially connected to the CR front contact is interposed to prevent false backup of ground to otherwise ungrounded input terminals. For example if, as described above, input terminal 7 is grounded, relays 0 and 7 will be operated, and ground would back up to terminals 1 and 2 through CR front contacts were it not for the relay 1 and 2 front contacts which are serially connected thereto.

The embodiment of Fig. 2, as hereinbefore stated, comprises a modification of the circuits of Fig. 1, in which provision is made for translation from a one-out-of-twelve code to a one- and two- and three-out-of-five code. In Fig. 2, the input terminals of Fig. 1 have been increased to twelve in number, the output terminals remain at five, and the relays have been increased to seven. Grounding of any one of the first three terminals OA, OB and AB will result in the operation of relay OA, OB or AB, respectively, in accordance with obvious paths leading from these three terminals to said three relays. Grounding of any one of the remaining nine input terminals OAS—ABS1 will, however, result in the operation of two of the six relays OA—CLS1 and relay CLT in the manner hereinbefore explained with reference to the embodiment of Fig. 1. Contacts of relay CLS1 are arranged to ground two of the five output terminals in order to provide translation to three-out-of-five code in response to activation of any one of terminals OAS1, OBS1 and ABS1. Thus, translation is accomplished from one-out-of-twelve to one-out-of-five code in response to grounding of any one of the first three of the twelve input terminals, from one-out-of-twelve to two-out-of-five code in response to grounding of any one of the next six input terminals and from one-out-of-twelve to three-out-of-five code in response to grounding of any one of the remaining three input terminals.

Although the invention has been illustrated by particular embodiments thereof, the invention is not limited to the specific apparatus and the particular arrangement therein disclosed. Various applications, modifications and arrangements of the invention will readily occur to those skilled in the art; for example, the principles underlying this invention could be readily embodied in a translator having input and output codes different from those herein disclosed.

The terms and expressions hereinbefore employed in reference to the invention are used as terms of description and not of limitation; and there is no intention in the use of such terms and expressions of excluding equivalents of the features shown and described or parts thereof, but on the contrary it is intended to include therein any and all equivalents, modifications and adaptations which may be employed without departing from the spirit of the invention.

What is claimed is:

1. A code translator comprising a plurality of input terminals each representative of a value in a first code, a lesser plurality of output terminals severally representative of said values in a second code, a plurality of translating relays equal in number to the total of said output terminals, a routing relay for variably extending paths from said input terminals to said translating relays, and means interconnecting said translating relays and said routing relay with said input terminals and said output terminals, whereby in response to the activation of any one of said input terminals, said translating relays are selectively rendered effective to activate one or more of said output terminals to express the value represented by said activated input terminal according to said second code.

2. A translating device comprising a plurality of input terminals each capable of activation to either of two electrical conditions, a lesser plurality of translating relays, a plurality of output terminals each capable of activation to either of two electrical conditions, means for connecting said translating relays to said output terminals, and routing means for variably extending paths from said input terminals to said translating relays, whereby in response to the activation of an input terminal to one of said electrical conditions, said translating relays are selectively rendered effective to change the electrical condition of said output terminals according to a predetermined relationship.

3. A translating device comprising a plurality of input terminals and a plurality of output terminals, each of said terminals being connectable to ground a plurality of translating relays equal in number to the total of said output terminals plus one and each including a grounded source of potential, means connecting said translating relays to said output terminals, and routing means for variably extending paths from said input terminals to said translating relays, whereby in response to the connection of ground to any one of said input terminals, said translating relays are selectively rendered effective to connect ground to one or more of said output terminals according to a predetermined relationship.

4. A code translator comprising a plurality of input terminals each individual to a value in a first code, a plurality of output terminals severally expressing in a second code each of said values in said first code, a plurality of translating relays, means for interconnecting said translating relays with said input terminals and said output terminals, means responsive to the application of a potential to one of said input terminals for rendering electrically effective one of said translating relays, and means responsive to the operation of said one of said translating relays for rendering electrically effective another of said translating relays.

5. A code translator comprising a plurality of input terminals each individual to a decimal value, a plurality of output terminals expressing in pairs each of said decimal values, means responsive to the application of a potential to one of said input terminals for rendering electrically effective one of the pair of output terminals expressive of the decimal value of the input terminal to which said potential is applied, and means responsive to the operation of said first-mentioned means for rendering electrically effective the other of said pair of output terminals.

6. A code translation device having a plurality of input terminals, a plurality of output terminals, and a plurality of relays, means to connect said input terminals to said relays, means responsive to the activation of one of said input terminals for operating one of said relays, routing means responsive to the operation of said one of said relays for extending a path from said one of said input terminals to another of said relays, thereby to operate said other relay, and path completing means responsive to the operation of said one and of said other of said relays for completing paths to two of said output terminals.

References Cited in the file of this patent

UNITED STATES PATENTS

| | | |
|---|---|---|
| 2,267,936 | Morrison | Dec. 30, 1941 |
| 2,369,474 | Luhn | Feb. 13, 1945 |